US012752795B2

(12) United States Patent
Stamenkovich

(10) Patent No.: US 12,752,795 B2
(45) Date of Patent: Oct. 6, 2026

(54) SYSTEM AND METHOD FOR REAL TIME VERIFICATION OF MOTION ESTIMATION VIA MAP PLAUSIBLE LOCALIZATION

(71) Applicant: Torc Robotics, Inc., Blacksburg, VA (US)

(72) Inventor: Joseph Allan Stamenkovich, Newport, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 60 days.

(21) Appl. No.: 18/907,000

(22) Filed: Oct. 4, 2024

(65) Prior Publication Data

US 2026/0097773 A1 Apr. 9, 2026

(51) Int. Cl.

*B60W 60/00* (2020.01)
*B60W 40/105* (2012.01)
*G01C 21/28* (2006.01)

(52) U.S. Cl.

CPC ........ *B60W 40/105* (2013.01); *B60W 60/001* (2020.02); *B60W 60/005* (2020.02); *G01C 21/28* (2013.01); *B60W 2420/403* (2013.01); *B60W 2420/408* (2024.01)

(58) Field of Classification Search

CPC ............. B60W 40/105; B60W 60/005; B60W 60/001; B60W 2420/408; B60W 2420/403; B60W 30/12; B60W 30/16; B60W 30/162; B60W 30/165; B60W 30/17; G01C 21/28; G05D 1/0061; G05D 1/0088; G05D 1/021; G05D 1/0214; G05D 1/0221; G05D 1/0223; B60K 28/00–165

See application file for complete search history.

(56) References Cited

U.S. PATENT DOCUMENTS

| | | | | |
|---|---|---|---|---|
| 5,095,269 | A * | 3/1992 | McNinch, Jr. | G01P 3/489 324/166 |
| 10,520,581 | B2 * | 12/2019 | Schuh | G06V 20/56 |
| 11,859,994 | B1 * | 1/2024 | Jeong | G01C 21/3644 |
| 2005/0217375 | A1 * | 10/2005 | Mase | G01C 19/5719 73/504.12 |
| 2009/0005985 | A1 * | 1/2009 | Basnayake | G01C 25/00 701/501 |
| 2020/0217952 | A1 * | 7/2020 | Rider | G01S 13/58 |
| 2020/0408529 | A1 * | 12/2020 | Zeng | G01C 21/165 |
| 2022/0121215 | A1 | 4/2022 | Kamata | |
| 2022/0185331 | A1 * | 6/2022 | Kaiser | B60W 50/0205 |
| 2022/0189054 | A1 * | 6/2022 | Kaiser | G06V 20/582 |

* cited by examiner

*Primary Examiner* — Manglesh M Patel
(74) *Attorney, Agent, or Firm* — McCarter & English, LLP

(57) ABSTRACT

A system including an internal sensor configured to generate first sensor data, an external perception sensor configured to generate second sensor data, at least one memory configured to store computer executable instructions, and at least one processor is disclosed. The at least one processor is coupled to the internal sensor, the external perception sensor, and the at least one memory. The at least one processor is configured to execute the computer executable instructions to: (i) compute a first velocity output based upon the first sensor data; (ii) compute a second velocity output based upon the second sensor data; (iii) compute a relative velocity between the first velocity output and the second velocity output; (iv) determine the relative velocity is outside a predetermined threshold value; and (v) perform an intervening action in response to the determining.

20 Claims, 5 Drawing Sheets

SYSTEM AND METHOD FOR REAL TIME VERIFICATION OF MOTION ESTIMATION VIA MAP PLAUSIBLE LOCALIZATION

TECHNICAL FIELD

The field of the disclosure relates generally to localization of an autonomous vehicle, more specifically, real rime verification of motion estimation via map plausible localization.

BACKGROUND OF THE INVENTION

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Localization techniques are based on motion estimation and map localization algorithms using sensor data of multiple sensors disposed at or within an autonomous vehicle. Different applications or features of the autonomous vehicle are dependent upon the motion estimation algorithm and the map localization algorithm. Accordingly, when the motion estimation algorithm is producing an output that does not align with an output of the map localization algorithm, then the autonomous vehicle potentially cannot rely on the motion estimation algorithm's output for safe operation.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a system including an internal sensor configured to generate first sensor data, an external perception sensor configured to generate second sensor data, at least one memory configured to store computer executable instructions, and at least one processor is disclosed. The at least one processor is coupled to the internal sensor, the external perception sensor, and the at least one memory. The at least one processor is configured to execute the computer executable instructions to: (i) compute a first velocity output based upon the first sensor data; (ii) compute a second velocity output based upon the second sensor data; (iii) compute a relative velocity between the first velocity output and the second velocity output; (iv) determine the relative velocity is outside a predetermined threshold value; and (v) perform an intervening action in response to the determining.

In another aspect, an autonomous vehicle including an internal sensor configured to generate first sensor data, an external perception sensor configured to generate second sensor data, at least one memory configured to store computer executable instructions, and at least one processor is disclosed. The at least one processor is coupled to the internal sensor, the external perception sensor, and the at least one memory. The at least one processor is configured to execute the computer executable instructions to: (i) compute a first velocity output based upon the first sensor data; (ii) compute a second velocity output based upon the second sensor data; (iii) compute a relative velocity between the first velocity output and the second velocity output; (iv) determine the relative velocity is outside a predetermined threshold value; and (v) perform an intervening action in response to the determining.

In yet another aspect, a computer-implemented method is disclosed. The method includes (i) computing a first velocity output based upon first sensor data, the first sensor data is generated using an internal sensor; (ii) computing a second velocity output based upon second sensor data, the second sensor is generated using an external perception sensor; (iii) computing a relative velocity between the first velocity output and the second velocity output; (iv) determining the relative velocity is outside a predetermined threshold value; and (v) performing an intervening action in response to the determining.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
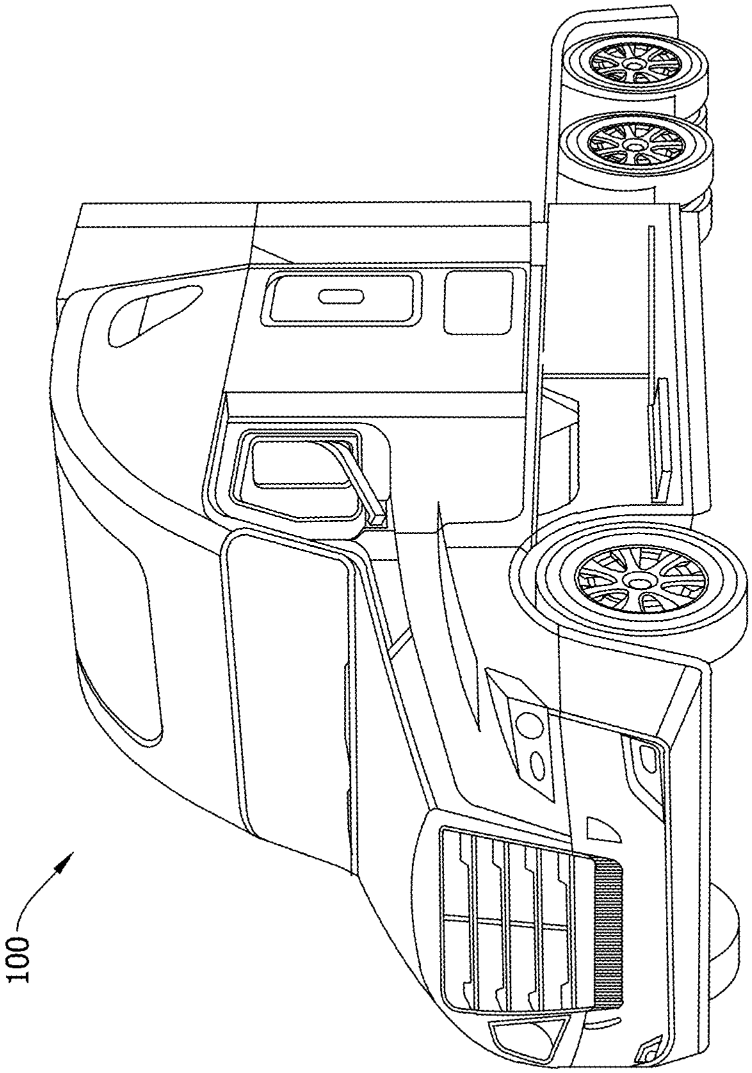
FIG. 1. is a schematic view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

Some structural or method features may be shown in specific arrangements and/or orderings in the drawings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments, and, in some embodiments, it may not be included or may be combined with other features.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

One or more of the following terms may be used in the disclosure, and their definition is provided below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Motion Estimation Algorithm: a motion estimation algorithm is also referenced herein as an inertial navigation algorithm, and may use internal sensors such as one or more accelerometers, one or more inertial measurement unit (IMU) sensors, or one or more odometers. Motion estimation algorithm provides very fast short-term (or short distance) feedback on movement, for example, of an autonomous vehicle. A motion estimation algorithm predicts or estimates motion of the autonomous vehicle based upon sensor data of the internal sensors.

Map Localization Algorithm: a map localization algorithm is also referenced herein as a map navigation algorithm and may use external perception sensors such as one or more camera sensors, or one or more light detection and ranging (LiDAR) sensors to refine an autonomous vehicle's position relative to features, for example, lane lines, road signals, etc., in the autonomous vehicle's environment. A map localization algorithm updates the autonomous vehicle's position on the global map with respect to a previous position of the autonomous vehicle. In other words, a map localization algorithm provides global position refinement of the autonomous vehicle.

Map Plausibility Algorithm: A map plausibility algorithm as disclosed herein compares detection of perception features of the entire visible region (in the environment of the autonomous vehicle) to compute a confidence score based upon real time sensor data of perception sensors and features concurrently displayed on the map.

As described herein, localization techniques are based on motion estimation and map localization algorithms using sensor data of multiple sensors disposed at or within an autonomous vehicle. Different applications or features of the autonomous vehicle are dependent upon the motion estimation algorithm and the map localization algorithm. Accordingly, when the motion estimation algorithm is producing an output that does not align with an output of the map localization algorithm, then the autonomous vehicle potentially cannot rely on the motion estimation algorithm's output for safe operation. Various embodiments disclosed herein identifies when the output of the motion estimation algorithm does not align with the output of the map localization algorithm, and any corrective measures to be taken to improve safe operation of the autonomous vehicle.

In an example embodiment, an autonomous vehicle's autonomy computing system may be configured to execute a map plausibility algorithm and may process an output of the motion estimation algorithm and an output of the map localization algorithm. In an example embodiment, without limitation, an output of the motion estimation algorithm may be a velocity, e.g., velocity_output_MEA, computed using an algorithm such as, a batch method, an online method, a dynamic algorithm, or a discrete turn algorithm. Similarly, an output of the map localization algorithm may be a velocity, e.g., velocity_output_MLA, computed using methods including frequency modulate continuous wave (FMCW), optical flow, disparity map, etc.

For example, the map plausibility algorithm may generate a velocity difference between the outputs of the motion estimation and map localization algorithms. Each of the motion estimation algorithms and map localization algorithms generates a velocity output (including a speed and a direction of movement) of the autonomous vehicle that is represented as a vector. The velocity output of the motion estimation algorithm generally is different from the velocity output of the map localization algorithm likely due to the position of the respective sensors, or the respective velocity output being generated by different algorithms.

In an example embodiment, a relative velocity (or a velocity difference between a velocity output of the motion estimation algorithm velocity_output_MEA and a velocity output of the map localization algorithm velocity_output_MLA) may be computed as:

$$\text{relative velocity} = \text{velocity\_output\_MEA} - \text{velocity\_output\_MLA} \quad \text{Eq. (1)}$$

In other words, the relative velocity is a difference between two vectors—velocity_output_MEA and velocity_output_MLA. The velocity_output_MEA and the velocity_output_MLA may be based upon synchronized sensor data or non-synchronized sensor data among sensor data gathered or collected by their respective sensors within a predetermined time difference (e.g., 10 milliseconds (ms), 50 ms, 100 ms, 500 ms, or 1 second, or any other value).

However, as long as, the relative velocity is within a preconfigured threshold value (or predetermined threshold value), the map plausibility algorithm would find the map localization algorithm and the motion estimation algorithm are convergent with each other and would generate an output indicating no intervening action is required to improve safe operation of the autonomous vehicle.

In contrast, when the relative velocity is at or exceeds the preconfigured threshold, the map plausibility algorithm would find the map localization algorithm and the motion estimation algorithm are divergent from each other and would generate an output indicating an intervening action is required to improve safe operation of the autonomous vehicle. By way of a non-limiting example, the intervening action may be a minimal risk maneuver performed within a map plausibility range. Map plausibility range is the maximum observable distance of map data and perception data detecting map elements. The minimal risk maneuver may include at least one of switching from an autonomous vehicle mode to a semi-autonomous vehicle mode or a non-autonomous vehicle mode or driving the autonomous vehicle to a safe stop (for example, by pulling over the autonomous vehicle on a shoulder or a side of a road) or the like. Additionally, or alternatively, functionality provided by the motion estimation algorithm is then provided by the map localization algorithm based upon sensor data of the external perception sensors. The following pseudo-algorithm, represents the embodiment described above.

```
if (map_plausible)
inertial_functioning = compare_relative_velocity (inertial_nav,
map_nav)
if (inertial_functioning_within_threshold)
  keep_inertial_nav
else
  use_map nav
```

In other words, a deviation in the velocities between the motion estimation algorithm and the map localization algorithm may be used to preemptively detect a fault in the motion estimation algorithm. Generally, the map localization algorithm is not used to verify motion estimation at run time (or in real time) because it is not known if the discrepancy in values could be attributed to the map. However, when a map-plausible localization algorithm is executing on the autonomy computing system, the map may be verified to be correct as part of the velocity or location output. Additionally, a failure in the INS system can be detected in real time (or near real time) and the minimal risk maneuver may be performed or activated instead of bringing the autonomous vehicle to a full stop given the potential safety risk to the autonomous vehicle.

FIG. 1 illustrates a vehicle 100, such as a truck that may be conventionally connected to a single or tandem trailer to transport the trailer (not shown in FIG. 1) to a desired location. The vehicle 100 includes a cabin that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin.

The vehicle 100 may be an autonomous vehicle, in which case the vehicle 100 may omit the steering wheel and the steering column to steer the vehicle 100. Rather, the vehicle 100 may be operated by an autonomy computing system (not shown in FIG. 1) of the vehicle 100 based on data collected by a sensor network (not shown in FIG. 1) including one or more sensors. The vehicle 100 may be an ego vehicle referenced herein.

Figure 2:
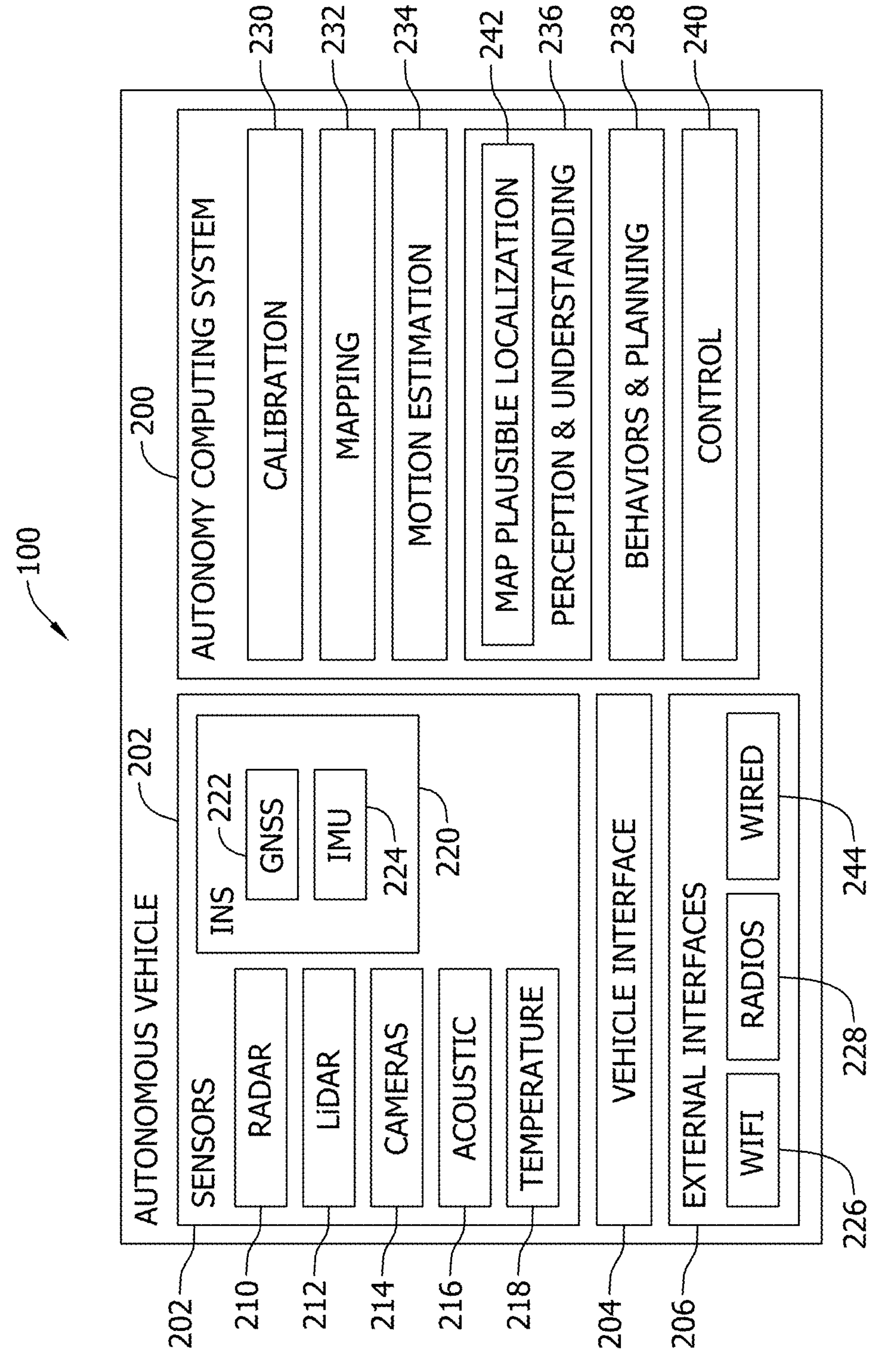
FIG. 2 is a block diagram of the autonomous truck shown in FIG. 1.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, and navigation sensors. Navigation sensors, as described herein, may be one or more inertial navigation system (INS) sensors (or systems) 220, one or more global navigation satellite system (GNSS) sensors 222, or one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers or other objects in the environment surrounding autonomous vehicle 100. In some embodiments, the image data generated by cameras 214 may be sent to autonomy computing system 200 or other aspects of autonomous vehicle 100 or mission control (a hub) or both.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment. Additionally, or alternatively, GNSS receiver 222 may be configured to receive RTK and GNSS position information from satellite-based systems.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5G, BLUETOOTH®, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a map plausible localization module 242. The map plausible localization module 242, for example, may be embodied within another module, such as behaviors and planning module 238, perception and understanding module 236, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100. The map plausible localization module 242 may implement the map plausible localization algorithm, as described herein.

Figure 3:
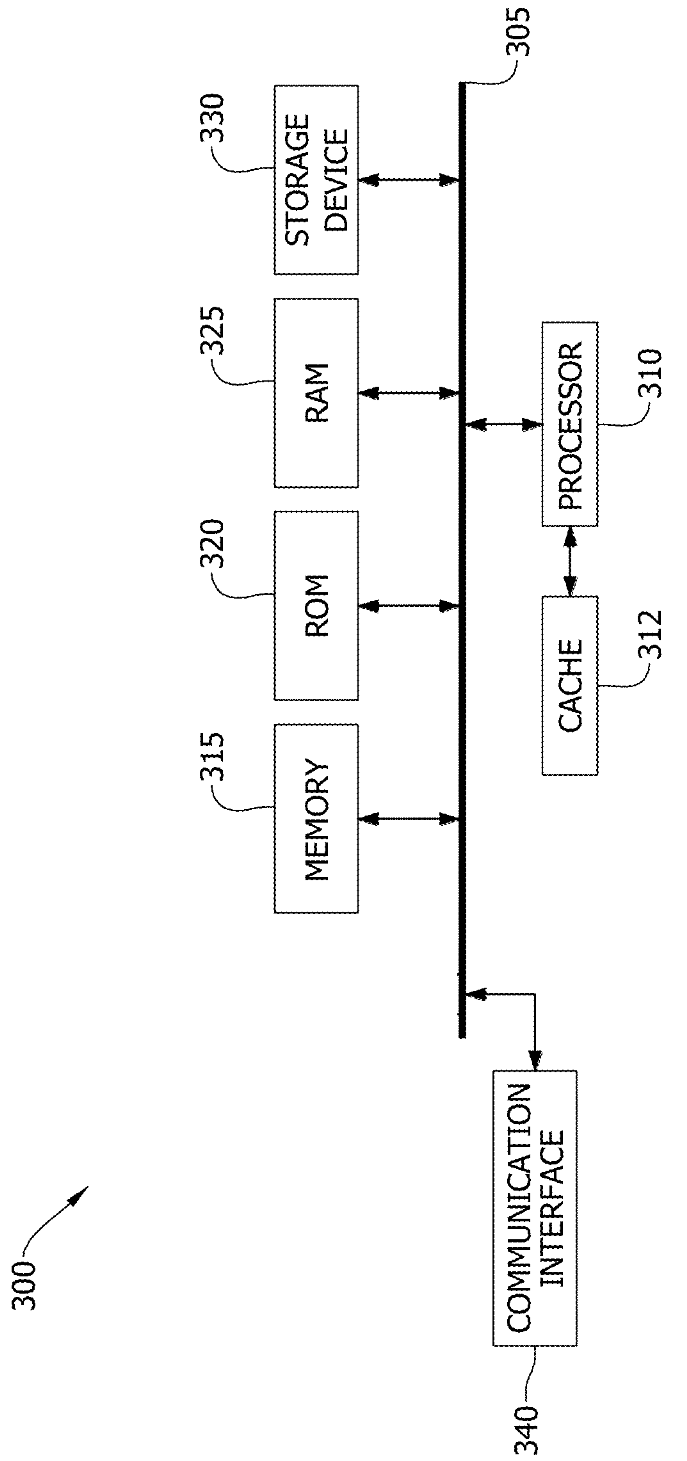
FIG. 3 is a block diagram of an example computing system.

FIG. 3 illustrates an example computing system 300 that can implement various techniques, processes, functions, or methods described herein. Computing system 300 may be embodied within, for example, autonomous vehicle 100 shown in FIG. 1. The components of computing system 300 are shown in electrical communication with each other using a connection 305, such as a bus. The example computing system 300 includes a processing unit (CPU or processor) 310 and a computing device connection 305 that couples various computing device components, including computing device memory 315, such as a read only memory (ROM) 320 and a random-access memory (RAM) 325, to processor 310.

The processor 310 may be communicatively coupled with a communication interface 340 to communicate with external entities such as, mission control, or one or more other vehicles using V2V communication. Accordingly, the communication interface 340 may include one or more of a radio interface, an electronic sign board mounted on autonomous vehicle 100, a public address system or a loudspeaker positioned at autonomous vehicle 100. The radio interface may be configured for at least one of: (i) a vehicle-to-vehicle communication technique, (ii) citizens band radio frequencies; (iii) a BLUETOOTH® signal; and (iv) a short message service (SMS) technology.

Computing system 300 can include a cache 312 of high-speed memory connected directly with, in close proximity to, or integrated as part of processor 310. Computing system 300 can copy data from memory 315 and/or storage device 330 to cache 312 for quick access by processor 310. In this way, cache 312 can provide a performance boost that avoids processor 310 delays while waiting for data. These and other modules can control or be configured to control processor 310 to perform various actions. Other computing device memory 315 may be available for use as well. Memory 315 can include multiple different types of memory with different performance characteristics. Processor 310 can include any general-purpose processor, central processing unit (CPU), or graphics processing unit (GPU) in combination with a hardware or software provision configured to control processor 310 and stored in storage device 330, as well as any special-purpose processor where software instructions are incorporated into the processor design. Processor 310 may be a self-contained system, containing multiple cores or processors, a bus, memory controller, cache, etc. A multi-core processor may be symmetric or asymmetric.

Storage device 330 is a non-volatile memory and can be one or more of a hard disk or other types of computer readable media that can store data that are accessible by a computer, such as a magnetic cassette, flash memory card, solid state memory device, digital versatile disk, cartridge, RAM 325, ROM 320, or hybrids thereof. Memory 315 or storage device 330 can include software, code, firmware, etc., for controlling processor 310. Other hardware or software modules are contemplated. Memory 315 and storage device 330 are connected to computing device connection 305. In one aspect, a hardware module that performs a particular function can include the software component stored in a computer-readable medium in connection with the necessary hardware components, such as processor 310, computing device connection 305, and so forth, to carry out the function. In the example embodiment, processor 310 may be programmed by encoding an operation or function using one or more executable instructions and providing the executable instructions in memory 315 or storage device 330.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Figure 4:
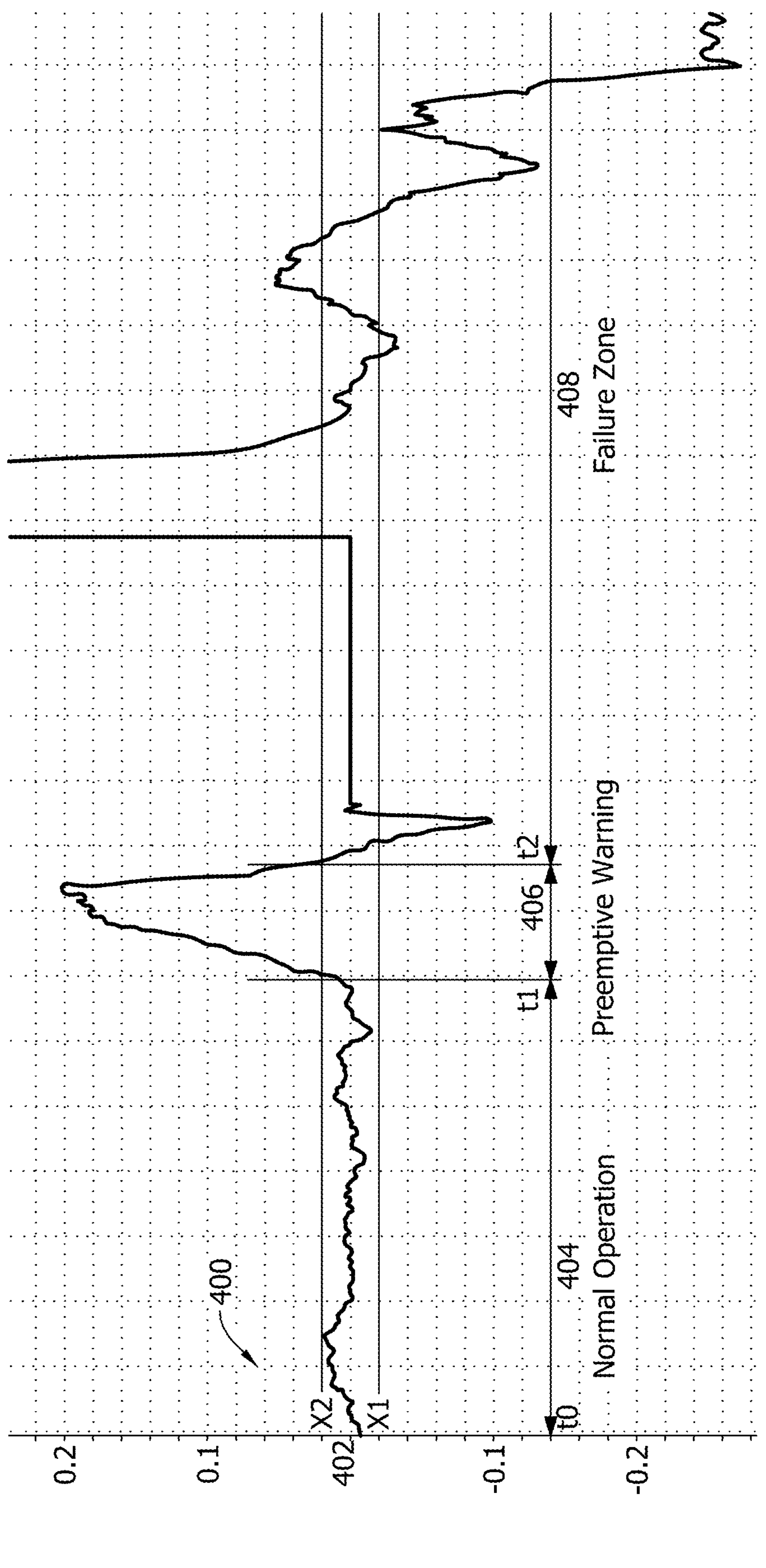
FIG. 4 illustrates an example diagram showing a relative velocity difference over time.

FIG. 4 illustrates an example diagram 400 of relative velocity difference along a Y-axis over time along an X-axis. As described herein, the relative velocity difference is a difference between velocity output of a motion estimation algorithm and velocity output of a map localization algorithm over time. The motion estimation algorithm may be embodied in and executed on the processing unit 310 (shown in FIG. 3) based upon sensor data of one or more accelerometers, one or more inertial measurement unit (IMU) sensors, or one or more odometers. Similarly, the map localization algorithm may be embodied in and executed on the processing unit 310 based upon sensor data of external perception sensors including one or more camera sensors, or one or more LiDAR sensors, or one or more RADAR sensors.

The preconfigured threshold value (or predetermined threshold value) 402, described herein, may be defined by a first relative velocity difference value $X_1$ and a second relative velocity difference value $X_2$. Both $X_1$ and $X_2$ have the same sign value. Further, since $X_1$ and $X_2$ represent velocity, $X_1$ and $X_2$ may also have a respective angular direction. The difference in angular direction between $X_1$ and $X_2$ may be expected to be within a predetermined angular difference (or a preconfigured angular difference) during a duration 404. Accordingly, the relative velocity difference, as computed using Eq. (1) or Eq. (2), if it is within the preconfigured threshold, processing unit 310, executing map plausible localization module 242, determines the map localization algorithm and the motion estimation algorithm are convergent with each other, and no intervening action is required to improve safe operation of the autonomous vehicle.

As shown in FIG. 4, for the duration 404 between times $t_0$ and $t_1$, the map localization algorithm and the motion estimation algorithm are convergent with each other as determined by map plausible localization module 242, and for a duration 406 between times $t_1$ and $t_2$, the map localization algorithm and the motion estimation algorithm are divergent from each other as determined by the map plausible localization module 242. The duration 406 may be also referenced herein as a preemptive warning period during which the map localization algorithm and the motion estimation algorithm are divergent from each other requiring an intervening action to improve safe operation of the autonomous vehicle, as described herein. During the preemptive warning period, an opportunity to take an action in order to prevent a failure on the road from happening is available.

By way of a non-limiting example, the intervening action may be a minimal risk maneuver performed within a map plausibility range. The minimal risk maneuver may include at least one of switching from an autonomous vehicle mode to a semi-autonomous vehicle mode or a non-autonomous vehicle mode or driving the autonomous vehicle to a safe stop (for example, by pulling over the autonomous vehicle on a shoulder or a side of a road) or like of it. Additionally, or alternatively, functionality provided by the motion estimation algorithms is then provided by the map localization algorithm based upon sensor data of the external perception sensors. The time duration 408 beyond $t_2$ may be referenced herein as a failure zone, during which the intervening action is performed, and the functionality provided by the motion estimation algorithms would be provided by the map localization algorithm based upon sensor data of the external perception sensors. During preemptive warning period 406, when a problem is noticed and where an intervening action is still possible, the intervening action is performed; during the failure zone 408, a minimal risk maneuver may no longer be possible because the motion estimation algorithms have failed completely.

Figure 5:
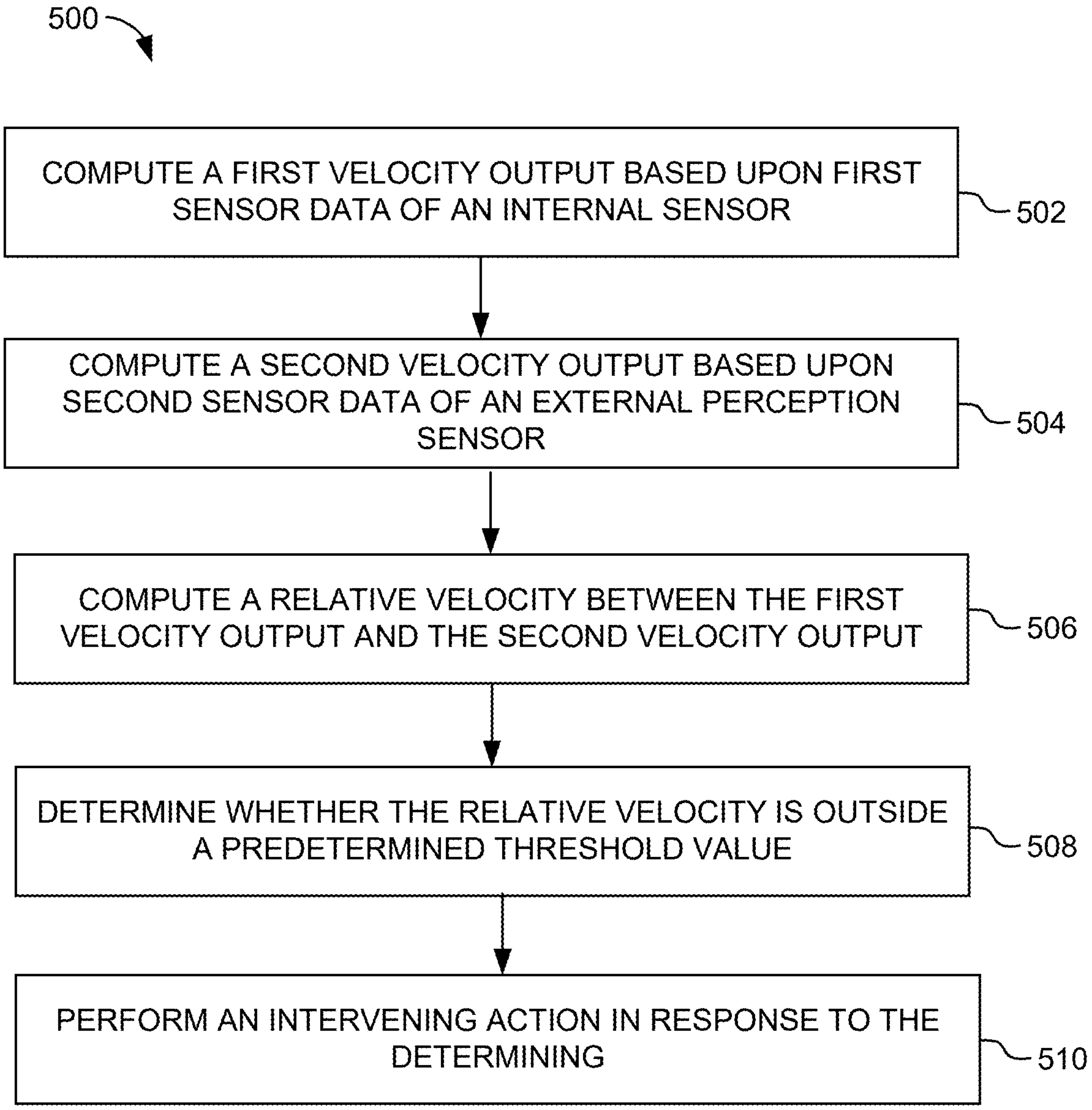
FIG. 5 is a flow diagram of an embodiment method of real rime verification of motion estimation via map plausible localization.

FIG. 5 is an example flow-chart 500 of method operations of real rime verification of motion estimation via map plausible localization algorithm or map plausible localization module 242 (shown in FIG. 2) or processor 310 (shown in FIG. 3) based upon first sensor data and second sensor data. The first sensor data is generated by an internal sensor such as, but not limited to, an accelerometer, an inertial measurement unit (IMU) sensor, or an odometer. The second sensor data is generated by an external perception sensor such as, but not limited to, a camera sensor, a light detection and ranging (LiDAR) sensor, or a radio detection and ranging (RADAR) sensor.

The method operations include computing 502 a first velocity output (velocity_output_MEA) based upon the first sensor data and computing 504 a second velocity output (velocity_output_MLA) based upon the second sensor data, as described herein. A relative velocity between the first velocity output and the second velocity output is computed 506 as a difference between velocity_output_MEA and velocity_output_MLA. A determination 508 is made for the relative velocity for the relative velocity being outside a predetermined threshold value (e.g., the predetermined threshold value 402), and an intervening action is performed 510 in response to determining that the relative velocity is outside the predetermined threshold value 402. The intervening action is performed by switching from an autonomous vehicle mode to a semi-autonomous vehicle mode or a non-autonomous vehicle mode, by driving the autonomous vehicle to a safe stop, or by performing motion estimation using a map localization algorithm based upon the sensor data of the one or more external perception sensors. By way of a non-limiting example, motion estimation using the map localization algorithm may be performed based upon a change in autonomous vehicle's position on the map in a given time duration. This may be done by computing odometry or position deltas relative to perceived map elements over small time scales. Additionally, an angular difference between the first velocity output and the second velocity output is determined, and the intervening action is performed in response to the determining that the angular difference is greater than a predetermined angular difference. By way of a non-limiting example, the predetermined angular difference may be 10 degrees or 20 degrees.

An example technical effect of the methods, systems, and apparatus described herein includes at least improving safe operation of the autonomous vehicle and detecting an issue with the internal sensors for motion estimation of the autonomous vehicle.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a program, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, including the implementation or utilization of components of the systems or steps independently and separately from other described components or steps. Therefore, it is manifestly intended that embodiments described herein be limited only by the claims.

What is claimed is:

1. A system, comprising:

an internal sensor configured to generate first sensor data;

an external perception sensor configured to generate second sensor data;

at least one memory configured to store computer executable instructions; and at least one processor coupled to the internal sensor, the external perception sensor, and the at least one memory, and configured to execute the computer executable instructions to:

compute a first velocity output based upon the first sensor data;

compute a second velocity output based upon the second sensor data;

determine based on a map plausibility algorithm applied to the second sensor data and map features, that a map localization output associated with the second velocity output is plausible;

compute a relative velocity between the first velocity output and the second velocity output in response to determining that the map localization output is plausible;

determine the relative velocity is outside a predetermined threshold value; and perform at least one intervening action in response to the determining, wherein the at least one intervening action is performed by driving the autonomous vehicle to a stop.

2. The system of claim 1, wherein the internal sensor includes an accelerometer, an inertial measurement unit (IMU) sensor, or an odometer.

3. The system of claim 1, wherein the external perception sensor includes a camera sensor, a light detection and ranging (LiDAR) sensor, or a radio detection and ranging (RADAR) sensor.

4. The system of claim 1, wherein the at least one intervening action is performed by switching from an autonomous vehicle mode to a semi-autonomous vehicle mode or a non-autonomous vehicle mode.

5. The system of claim 1, wherein the stop is a safe stop on a shoulder or a side of a road.

6. The system of claim 1, wherein the at least one intervening action is performed by performing motion estimation using a map localization algorithm based upon the sensor data of the one or more external perception sensors.

7. The system of claim 1, wherein the at least one processor is further configured to execute the computer executable instructions to:

determine an angular difference between the first velocity output and the second velocity output; and perform the at least one intervening action in response to the determining that the angular difference is greater than a predetermined angular difference.

8. An autonomous vehicle, comprising:

an internal sensor configured to generate first sensor data;

an external perception sensor configured to generate second sensor data;

at least one memory configured to store computer executable instructions; and at least one processor coupled to the internal sensor, the external perception sensor, and the at least one memory, and configured to execute the computer executable instructions to:

compute a first velocity output based upon the first sensor data;

compute a second velocity output based upon the second sensor data;

determine based on a map plausibility algorithm applied to the second sensor data and map features, that a map localization output associated with the second velocity output is plausible;

compute a relative velocity between the first velocity output and the second velocity output in response to determining that the map localization output is plausible;

determine the relative velocity is outside a predetermined threshold value; and perform at least one intervening action in response to the determining, wherein the at least one intervening action is performed by driving the autonomous vehicle to a stop.

9. The autonomous vehicle of claim 8, wherein the internal sensor includes an accelerometer, an inertial measurement unit (IMU) sensor, or an odometer.

10. The autonomous vehicle of claim 8, wherein the external perception sensor includes a camera sensor, a light detection and ranging (LiDAR) sensor, or a radio detection and ranging (RADAR) sensor.

11. The autonomous vehicle of claim 8, wherein the at least one intervening action is performed by switching from an autonomous vehicle mode to a semi-autonomous vehicle mode or a non-autonomous vehicle mode.

12. The autonomous vehicle of claim 8, wherein the stop is a safe stop on a shoulder or a side of a road.

13. The autonomous vehicle of claim 8, wherein the at least one intervening action is performed by performing motion estimation using a map localization algorithm based upon the sensor data of the one or more external perception sensors.

14. The autonomous vehicle of claim 8, wherein the at least one processor is further configured to execute the computer executable instructions to:

determine an angular difference between the first velocity output and the second velocity output; and perform the at least one intervening action in response to the determining that the angular difference is greater than a predetermined angular difference.

15. A computer-implemented method, comprising:

computing a first velocity output based upon first sensor data, the first sensor data is generated using an internal sensor;

computing a second velocity output based upon second sensor data, the second sensor is generated using an external perception sensor;

determining based on a map plausibility algorithm applied to the second sensor data and map features, that a map localization output associated with the second velocity output is plausible;

computing a relative velocity between the first velocity output and the second velocity output in response to determining that the map localization output is plausible;

determining the relative velocity is outside a predetermined threshold value; and performing at least one intervening action in response to the determining, wherein the at least one intervening action is performed by driving the autonomous vehicle to a stop.

16. The computer-implemented method of claim 15, wherein:

the internal sensor includes an accelerometer, an inertial measurement unit (IMU) sensor, or an odometer; and the external perception sensor includes a camera sensor, a light detection and ranging (LiDAR) sensor, or a radio detection and ranging (RADAR) sensor.

17. The computer-implemented method of claim 15, wherein performing the at least one intervening action comprises switching from an autonomous vehicle mode to a semi-autonomous vehicle mode or a non-autonomous vehicle mode.

18. The computer-implemented method of claim 15, wherein the stop is a safe stop on a shoulder or a side of a road.

19. The computer-implemented method of claim 15, wherein performing the at least one intervening action comprises performing motion estimation using a map localization algorithm based upon the sensor data of the one or more external perception sensors.

20. The computer-implemented method of claim 15, further comprising:

determining an angular difference between the first velocity output and the second velocity output; and performing the at least one intervening action in response to the determining that the angular difference is greater than a predetermined angular difference.

* * * * *